Patented Aug. 30, 1927.

1,640,717

UNITED STATES PATENT OFFICE.

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE.

MANUFACTURE OF LARGE-GRAINED DEXTROSE.

No Drawing. Original application filed September 10, 1924, Serial No. 736,945. Divided and this application filed October 23, 1924. Serial No. 745,375.

My invention relates to the manufacture of dextrose from starch or starch bearing materials and its object is to provide a novel method of making a pure or substantially pure dextrose in the form of large grains or crystals. This application is a division of my co-pending application Serial No. 736,945 (Patent No. 1,521,830), filed September 10, 1924 as a continuation in part of an application Serial No. 705,780, filed April 11, 1924.

The dextrose of the type contemplated by this invention may be either of the hydrate or the anhydrous type.

The preferred method of manufacturing the hydrate is as follows:

The starch is converted, preferably by the usual method of hydrolysis to as high a dextrose content as practical, 89% to 90% for example, based on dry substances. The converted liquor is then preferably filtered by being run through bone char and is thereafter concentrated in a vacuum pan to a density of from approximately 38° to 40° Baumé. The preferably density is close to 38° Baumé. This density is considerably lower than the preferred density employed for making the smaller grained product in accordance with the process described in application, Serial No. 736,945. The concentration in the vacuum pan may be conducted according to circumstances at any temperature from 130° to 180° Fahrenheit. The liquor taken from the vacuum pan is then preferably cooled and thereafter is introduced into a crystallizer which latter is provided preferably with means for keeping the solution in gentle agitation and with cooling means such, for example, as a water jacket. The liquor is preferably cooled, precedent to being introduced into the crystallizer sufficiently to give it substantial supersaturation without however inducing the formation of crystals to any appreciable extent. This is possible because of the large supersaturation which dextrose solutions can carry. After the solution has been cooled it is mixed with a relatively large quantity of dextrose in the solid phase (crystals). For this purpose I use, preferably, a portion of the crystallized magma (crystals and mother liquor termed foots) from a preceding crystallizing operation, this portion of the batch being left in the crystallizer and the fresh liquor being run upon the same before the foots have had a chance to set. The foots are, however, at a considerably lower temperature than that of the solution and act to cool the solution so that crystallization of the dextrose is initiated. Preferably the amount of foots will be approximately 40% of the new batch (assuming a purity of the converted liquid of about 89%), the other 60% of the batch consisting of fresh converted, concentrated and cooled solution. These proportions may be varied over quite a wide range. The amount of foots may for example, vary from 30% to 45% of the batch with a liquor of approximately the purity mentioned. The solid phase will ordinarily be from four-tenths to six-tenths of the foots, the remainder being mother liquor. The proportions of solid phase to liquid may therefore vary approximately from 10 to 40 parts of solids to 100 parts of liquid. However these proportions are subject to still further variation with converted liquors of substantially different purity from that mentioned. The extent to which the solution is pre-cooled depends upon the temperature of the foots to be added thereto, the object being to regulate these temperatures so as to obtain a temperature of the mixture most favorable for the initiation of crystallization. For the hydrate sugar this temperature is preferably 105° Fahrenheit or thereabout. It may be considerably higher than this, for example as high as 130° Fahrenheit, depending upon the character of the converted liquor as to the quantity and nature of its impurities. While as high a temperature as 130° is within the anhydrous range, as ordinarily considered, the predominance of the large quantity of hydrate solid phase prevents crystallization either as anhydrid or as false grain. If the heat developed by crystallization (dextrose crystallizing exothermically) is in excess of radiation, the mass may be cooled to maintain the desired temperature by circulating water through the water jacket of the crystallizer. After the crystallization has gotten well under way the mass may be further cooled so to bring the ultimate temperature down as low as 80° Fahrenheit or even lower. This is made possible, without detriment to the crystallizing operation, by the presence in the solution of large quantities of the solid phase.

Most of the dextrose crystallizing out of the solution goes to build up the crystals introduced initially as foots from the crystallizing operation. Only a small part crystallizes out as new crystals. This is due to the relatively low density of the solution. However, as the orginal crystals build up in the successive batch treatments, the quantity of newly induced crystals will increase, generally speaking, in proportion to the growth in size of the old crystals until a balanced condition is arrived at; after which the old crystals will cease to grow very appreciably and new crystals will be induced in sufficient quantity so that the process can be carried on indefinitely by the successive crystallizing operations mentioned, a part of each batch being used for seeding the following batch, the remainder being withdrawn. This withdrawn portion, approximately 60% of the batch, is centrifuged to extract the mother liquor and is then washed with water preferably, and dried. It will contain, necessarily, some small grains which, if desired, may be sifted out.

The use of solid phase, as seed, in quantity sufficient so that the solid phase is what I have termed a significant factor in controlling crystallization and the derivation of this seed from a preceding crystallizing operation in the form of nascent crystals mixed with mother liquor, make it possible to obtain a purgeable magma, in which the crystals are of more than usual size and uncontaminated by false grain. The use of relatively large quantity of foots has, in fact, a direct bearing upon the production of a large grained sugar. That is, the low gravity of the solution involves, at normal temperatures, so slight a supersaturation, that with a large quantity of the solid phase present in dispersed condition throughout the solution (this dispersion being accomplished by the agitating means above referred to) most of the available sugar crystallizing out of the solution will go to build up the original seed as stated, whereas if the usual small quantity of seed were used in the first instance there would be necessarily such large induction of new crystals as to defeat the object in view.

For the manufacture of anhydrous sugar the same conditions are maintained, except that the initial temperature of crystallization will be approximately from 130° to 145° Fahrenheit for converted liquor of the ordinary purity mentioned and the final temperature approximately from 100° to 120° Fahrenheit.

The mother liquor from the centrifugal machine may be retreated for a second yield of crystals as described in my application Serial No. 736,945.

The actual temperatures and densities will, in any case, depend, necessarily, upon the character of the converted liquor in respect to the quantity and nature of its impurities. The duration of the crystallizing operation will also vary, considerably, depending upon the character of the material treated. The proportion as between the foots and the liquor for a given batch will also depend upon similar varying conditions. In matters of detail, therefore, something must be left to the discretion of the skilled operator. I have endeavored to lay down the principles covering the improved process herein described and claimed and have stated temperatures, densities and proportions within the limits which I have found practical and desirable in order to obtain the best results from the viewpoint of high purity of the product and economy of manufacture. The term "starch converted dextrose solution" is intended to include not only the liquors direct from the converters, but also mother liquors from the centrifugals and remelts, or mixtures of any of these liquors so far as the same are suitable for the purpose of my invention.

I claim:

1. Method of making large grained crystalline dextrose from a starch converted solution which consists in maintaining a relatively large quantity of dextrose crystals uniformly dispersed through a solution and gradually cooling the solution to maintain a supersaturation so slight that most of the dextrose crystallizing out of the solution goes to build up the size of the crystals originally introduced.

2. Method of making large grained crystalline dextrose from a starch converted solution which consists in introducing a relatively large quantity of dextrose crystals into and maintaining the same uniformly dispersed through a solution having a density of substantially 38° to 40° Baumé.

3. Method of making large grained crystalline dextrose from a starch converted solution which consists in crystallizing in successive batches and introducing in each case a relatively large quantity of foots, taken from a preceding crystallizing operation into and maintaining the same uniformly dispersed through a solution having a supersaturation so slight that a large portion of the dextrose crystallizing out of the solution goes to build up the size of the introduced crystals while the remaining portion is in the form of newly induced crystals to provide for the continuation of the process.

4. Method of making large grained crystalline dextrose from a starch converted solution which consists in crystallizing in successive batches solutions which have a density of substantially 38° to 40° Baumé and introducing into and maintaining uniformly dispersed through each batch of solution a quantity of foots taken from a preceding batch in amount not substantially less than 30% of the new batch.

5. Method of making large grained crystalline dextrose from a starch converted solution which consists in concentrating the solution by heating to a density of substantially 38° to 40° Baumé, cooling the solution and mixing with the same a quantity of foots taken from a previous crystallizing operation in amount sufficient so that the quantity of the solid phase introduced is a significant factor in controlling crystallization and so that most of the dextrose crystallizing out of the solution builds up the solid phase present instead of forming new crystals.

6. Method of making large grained crystalline dextrose from a starch converted solution which consists in concentrating the solution by heating to a density of substantially 38° to 40° Baumé, cooling the solution, mixing with the same a quantity of foots taken from a previous crystallizing operation in amount sufficient so that the quantity of the solid phase introduced is a significant factor in controlling crystallization and so that most of the dextrose crystallizing out of the solution builds up the solid phase present instead of forming new crystals and reducing the temperature of the magma during the crystallizing operation.

7. Method of making large grained crystalline dextrose from a starch converted dextrose solution which consists in maintaining a relatively large quantity of dextrose crystals of a single crystal type uniformly dispersed through a dextrose solution at a temperature favorable to the crystallization of dextrose of the crystal type of the solid phase present and gradually cooling the solution to maintain a supersaturation so slight that most of the dextrose crystallizing out of solution goes to build up the size of the crystals originally introduced.

WILLIAM B. NEWKIRK.